United States Patent
Ichinose et al.

(10) Patent No.: US 8,494,675 B2
(45) Date of Patent: Jul. 23, 2013

(54) AUTONOMOUS MOBILE ROBOT DEVICE AND AN AVOIDANCE METHOD FOR THAT AUTONOMOUS MOBILE ROBOT DEVICE

(75) Inventors: Ryoko Ichinose, Tsukuba (JP); Takashi Tsubouchi, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 12/405,363

(22) Filed: Mar. 17, 2009

(65) Prior Publication Data
US 2009/0234527 A1 Sep. 17, 2009

(30) Foreign Application Priority Data
Mar. 17, 2008 (JP) ................................ 2008-067687

(51) Int. Cl.
*G06F 19/00* (2011.01)
(52) U.S. Cl.
USPC ........... 700/245; 700/246; 700/248; 700/253; 700/255; 700/258
(58) Field of Classification Search
USPC . 700/245, 248, 255, 246, 253, 258; 701/32.2, 701/301; 901/1, 8
See application file for complete search history.

(56) References Cited

U.S. PATENT DOCUMENTS

| | | | | |
|---|---|---|---|---|
| 5,502,638 | A * | 3/1996 | Takenaka | 701/87 |
| 5,819,008 | A * | 10/1998 | Asama et al. | 700/255 |
| 6,009,377 | A * | 12/1999 | Hiwatashi | 701/301 |
| 6,438,491 | B1 * | 8/2002 | Farmer | 701/301 |
| 6,480,789 | B2 * | 11/2002 | Lin | 701/301 |
| 6,615,137 | B2 * | 9/2003 | Lutter et al. | 701/301 |
| 6,624,782 | B2 * | 9/2003 | Jocoy et al. | 342/70 |
| 6,832,156 | B2 * | 12/2004 | Farmer | 701/301 |
| 6,861,957 | B2 * | 3/2005 | Koike | 340/903 |
| 6,882,915 | B2 * | 4/2005 | Yamamura et al. | 701/45 |

(Continued)

FOREIGN PATENT DOCUMENTS

| | | |
|---|---|---|
| JP | 63-150710 | 6/1988 |
| JP | 9-171599 | 6/1997 |
| JP | 09-185412 | 7/1997 |
| JP | 2008-065755 | 3/2008 |

*Primary Examiner* — Khoi Tran
*Assistant Examiner* — Jorge Peche
(74) *Attorney, Agent, or Firm* — Antonelli, Terry, Stout & Kraus, LLP.

(57) ABSTRACT

An autonomous mobile robot device, comprises an obstacle detecting unit, which is configured to detect an obstacle, a path producing unit, which is configured to produce a path for reaching to a goal while avoiding the obstacle, which is detected by the obstacle detecting unit, upon basis of a predetermined avoidance method, and a moving unit, which is configured to move while mounting the obstacle detecting unit and the path producing unit thereon, and further comprises an avoidance method noticing unit, which is configured to notice information relating to an avoidance method of the autonomous mobile robot device itself to the obstacle, which is detected by the obstacle detecting unit, an other's avoidance method obtaining unit, which is configured to obtain information relating to the avoidance method of the obstacle from the obstacle, which is detected by the obstacle detecting unit, an avoidance method memorizing unit, which is configured to memorize one or more of the avoidance method(s) determined, to which the path producing unit should follow, and an avoidance method selecting unit, which is configured to selected the avoidance method(s) determined from the avoidance method memorizing unit, wherein the avoidance method selecting unit uses the information relating to the avoidance method of the obstacle, which is obtained by the other's avoidance method obtaining unit, as a reference, when selecting the avoidance method.

18 Claims, 13 Drawing Sheets

U.S. PATENT DOCUMENTS

| | | | |
|---|---|---|---|
| 6,906,639 B2* | 6/2005 | Lemelson et al. | 340/903 |
| 6,934,614 B2* | 8/2005 | Yamamura et al. | 701/45 |
| 7,069,146 B2* | 6/2006 | Yamamura et al. | 701/301 |
| 7,138,938 B1* | 11/2006 | Prakah-Asante et al. | 342/70 |
| 7,184,889 B2* | 2/2007 | Isaji et al. | 701/301 |
| 7,215,254 B2* | 5/2007 | Tauchi | 340/903 |
| 7,266,477 B2* | 9/2007 | Foessel | 702/189 |
| 7,295,925 B2* | 11/2007 | Breed et al. | 701/301 |
| 7,545,261 B1* | 6/2009 | Harrington | 340/435 |
| 7,548,805 B2* | 6/2009 | Yamaguchi et al. | 701/36 |
| 7,660,669 B2* | 2/2010 | Tsuda | 701/301 |
| 7,783,403 B2* | 8/2010 | Breed | 701/45 |
| 7,848,884 B2* | 12/2010 | Kawasaki | 701/301 |
| 7,873,474 B2* | 1/2011 | Yamamoto et al. | 701/301 |
| 7,904,246 B2* | 3/2011 | Kondoh et al. | 701/301 |
| 8,180,545 B2* | 5/2012 | Monsere et al. | 701/70 |
| 8,209,100 B2* | 6/2012 | Sin et al. | 701/70 |
| 2002/0036584 A1* | 3/2002 | Jocoy et al. | 342/70 |
| 2002/0069019 A1* | 6/2002 | Lin | 701/301 |
| 2002/0198660 A1* | 12/2002 | Lutter et al. | 701/301 |
| 2003/0006889 A1* | 1/2003 | Koike | 340/435 |
| 2005/0107955 A1* | 5/2005 | Isaji et al. | 701/301 |
| 2005/0187713 A1* | 8/2005 | Yamamura et al. | 701/301 |
| 2005/0231340 A1* | 10/2005 | Tauchi | 340/435 |
| 2005/0278098 A1* | 12/2005 | Breed | 701/45 |
| 2006/0015242 A1* | 1/2006 | Yoshida | 701/96 |
| 2006/0250297 A1* | 11/2006 | Prakah-Asante et al. | 342/70 |
| 2007/0282532 A1* | 12/2007 | Yamamoto et al. | 701/301 |
| 2008/0036294 A1* | 2/2008 | Yamamoto et al. | 303/116.1 |
| 2008/0040004 A1* | 2/2008 | Breed | 701/45 |
| 2008/0147261 A1* | 6/2008 | Ichinose et al. | 701/24 |
| 2008/0243323 A1* | 10/2008 | Karnjate et al. | 701/22 |
| 2009/0228157 A1* | 9/2009 | Breed | 701/1 |
| 2010/0202495 A1* | 8/2010 | Kagawa et al. | 375/142 |
| 2010/0261428 A1* | 10/2010 | Goto | 455/41.2 |

* cited by examiner

FIG. 4

| AVOIDING PERFORMANCES | |
|---|---|
| AVOIDING DIRECTION | CHANGE OF DIRECTION TO PRESENT ADVANCING DIRECTION |
| | PASS BY ON RIGHT-HAND SIDE OR LEFT-HAND SIDE OF OTHER |
| POSITION INFORMATION | |
| INDIVIDUAL IDENTITY INFORMATION (UNIQUE NUMBER) | |
| NOTICE TIME | |
| EXISTENCE/POSITION OF COMPANY | |
| PASS PROHIBITION DIRECTION | |
| OBSTACLE DETECTION INFORMATION | |

FIG. 8

|  |  | OBSTACLE | | |
|---|---|---|---|---|
|  |  | HIGH OF AVOIDING PERFORMANCES | LOW OF AVOIDING PERFORMANCES | NO INFORMATION OF AVOIDANCE METHOD |
| ITSELF | HIGH OF AVOIDING PERFORMANCES | AVOIDANCE METHOD "B" GIVING PRIORITY TO EITHER ONE AVOIDING DIRECTION | AVOIDANCE METHOD "B" GIVING PRIORITY TO AVOIDING DIRECTION OF OBSTACLE | AVOIDANCE METHOD "A" |
| | LOW OF AVOIDING PERFORMANCES | AVOIDANCE METHOD "B" GIVING PRIORITY TO AVOIDING DIRECTION OF ITSELF | AVOIDANCE METHOD "B" GIVING PRIORITY TO EITHER ONE AVOIDING DIRECTION | AVOIDANCE METHOD "A" |

AUTONOMOUS MOBILE ROBOT DEVICE AND AN AVOIDANCE METHOD FOR THAT AUTONOMOUS MOBILE ROBOT DEVICE

BACKGROUND OF THE INVENTION

The present invention relates to an autonomous mobile robot device and an avoidance method of that autonomous mobile robot device, for avoiding an obstacle, which can smoothly move in traffic, where human beings and various kinds of robots come and go, busily.

In recent years, a large number of developments are made on robots to be used within a life of a human being, such as, an office robot and a pet robot, but differing from an industrial robot of the conventional art. Those robots do works, such as, guidance, conveyance, guard, etc., while autonomously moving within a house or within an office, but not in a fixed facilities or accommodation. When they moves autonomously, for the purpose of safety, the robots must to move not collide upon a human being and/or things.

Conventionally, the robot is provided with a means for detecting the human being and the things or the like, in the direction of advancement, such as, an ultrasonic sensor or a laser radar, etc., and when detecting an obstacle, such as, the human being and the things or the like, in the near distance therefrom, it changes a path to an avoiding or roundabout one. However, there is a possibility that it moves into a same direction to that of a moving obstacle also trying to avoid that robot, and in such case, both of them are unable to avoid each other. Further, for the purpose of avoiding, if both the moving obstacle and the robot change the directions opposite to each other, at the same timing, then they also falls into be unable to avoid; i.e., during that time period, the moving obstacle and the robot come close to each other too much, and they need to make deceleration or stoppage for avoiding the collision therebetween.

For example, in the following Patent Document 1 is disclosed a technology of providing a means, for determining on whether an obstacle is a human being or not, with providing an infrared sensor for detecting an infrared ray irradiated from the obstacle, and in case where it is the human being, for sopping the robot for a certain time period, to wait until the human being go away in the direction of advancement, and restarting the movement after the leave of the human being.

[Patent Document 1] Japanese Patent Laying-Open No. Hei 09-185412 (1997).

BRIEF SUMMARY OF THE INVENTION

However, with the technology described in the Patent Document 1, a possibility is high that a human being is detected in the direction of advancement when the robot moves in an office crowded with a large number of peoples or on a street, and if stopping every time in such occasion, the robot cannot move quickly, so that a work efficiency of the robot goes down, and there is a drawback that utility value of the robot is lowered down. Further, the conventional art mentioned above mentions nothing about a countermeasure to an obstacle other than the human being.

An object of the present invention, accomplished by taking the drawback mentioned above into the consideration thereof, is provide an autonomous mobile robot device and an avoidance method for that autonomous mobile robot device, for avoiding an obstacle with enabling a quick movement while avoiding the obstacle therefrom.

For accomplishing the object mentioned above, according to the present invention, there is provided an autonomous mobile robot device, comprising: an obstacle detecting unit, which is configured to detect an obstacle; a path producing unit, which is configured to produce a path for reaching to a goal while avoiding said obstacle, which is detected by said obstacle detecting unit, upon basis of a predetermined avoidance method; and a moving unit, which is configured to move while mounting said obstacle detecting unit and said path producing unit thereon, and further comprising: an avoidance method noticing unit, which is configured to notice information relating to an avoidance method of said autonomous mobile robot device itself to said obstacle, which is detected by said obstacle detecting unit; an other's avoidance method obtaining unit, which is configured to obtain information relating to the avoidance method of said obstacle from said obstacle, which is detected by said obstacle detecting unit; an avoidance method memorizing unit, which is configured to memorize one or more of said avoidance method(s) determined, to which said path producing unit should follow; and an avoidance method selecting unit, which is configured to selected said avoidance method(s) determined from said avoidance method memorizing unit, wherein said avoidance method selecting unit uses the information relating to the avoidance method of said obstacle, which is obtained by said other's avoidance method obtaining unit, as a reference, when selecting said avoidance method.

Also, according to the present invention, within the autonomous mobile robot device, as described in the above, wherein said information relating to the avoidance method includes avoiding direction information indicating a direction of avoiding and avoiding performance information indicative of avoiding performances.

Also, according to the present invention, within the autonomous mobile robot device, as described in the above, wherein said information relating to the avoidance method includes individual identity information indicating an identity of an individual, and said autonomous mobile robot device further comprises: an individual identity information detecting unit, which is configured to detect said individual identity information of said obstacle, which is detected by said obstacle detecting unit, wherein said obstacle, which is detected by said obstacle detecting unit, and said avoidance method, which said other's avoidance method obtaining unit obtains, are related with each other, with using said individual identity information.

Also, according to the present invention, within the autonomous mobile robot device, as described in the above, wherein said information relating to the avoidance method includes position information indicating a position of itself or said obstacle, and said obstacle, which is detected by said obstacle detecting unit, and said avoidance method, which said other's avoidance method obtaining unit obtains, are related with each other, with using said position information.

Also, according to the present invention, within the autonomous mobile robot device, as described in the above, wherein said information relating to the avoidance method includes presence/absence information of a company, indicating whether said obstacle accompanies the company or not, position information of said company, and individual identity information of said company, and said path producing unit produces a path, not passing through between said obstacle and said company, when the information relating to the avoidance method of an other, which said other's avoidance method obtaining unit obtains, indicates that it has the company.

Also, according to the present invention, within the autonomous mobile robot device, as described in the above, wherein said information relating to the avoidance method includes information relating to a pass prohibition direction therein, and said path producing unit produces a path, not passing in the direction designated, when the information relating to the avoidance method, which said other's avoidance method obtaining unit obtains, includes the information relating to said pass prohibition direction.

Also, according to the present invention, within the autonomous mobile robot device, as described in the above, wherein said information relating to the avoidance method includes information relating to detection of the obstacle therein, and said path producing unit produces a path, avoiding the obstacle indicated by the information relating to detection of said obstacle, which said other's avoidance method obtaining unit obtains, when the information relating to detection of said obstacle is included within the information relating to said avoidance method, which said other's avoidance method obtaining unit obtains.

Also, according to the present invention, within the autonomous mobile robot device, as described in the above, wherein said avoidance method selecting unit selects an avoidance method for case of not obtaining the avoidance method of an other from said avoidance method memorizing unit, until when said other's avoidance method obtaining unit obtains the information relating to the avoidance method from the obstacle, which said obstacle detecting unit detects.

Also, according to the present invention, for accomplishing the object mentioned above, there is further provided an avoidance method for an autonomous mobile robot device, having: an obstacle detecting unit, which is configured to detect an obstacle; a path producing unit, which is configured to produce a path for reaching to a goal while avoiding said obstacle, which is detected by said obstacle detecting unit, upon basis of a predetermined avoidance method; and a moving unit, which is configured to move while mounting said obstacle detecting unit and said path producing unit thereon, comprising the followings steps of: noticing information relating to an avoidance method of said autonomous mobile robot device itself to said obstacle, which is detected by said obstacle detecting unit; obtaining information relating to the avoidance method of said obstacle from said obstacle; memorizing therein one or more of said avoidance method(s) determined, to which said path producing unit should follow; and selecting said avoidance method memorized upon basis of the information relating to the avoidance method of said obstacle.

Also, according to the present invention, within the avoidance method for an autonomous mobile robot device, as described in the above, wherein when an advancing direction of said obstacle changes into a direction into which the robot device itself is going to avoid, while detecting the advancing direction of said obstacle by said obstacle detecting unit, said path producing unit produces another different avoiding path, with setting a time, from when determining that the advancing direction of said obstacle changes to the avoiding direction of itself until when said path producing unit produces that different avoiding path, to a random number.

Also, according to the present invention, within the avoidance method for an autonomous mobile robot device, as described in the above, wherein when an advancing direction of said obstacle changes into a direction into which the robot device itself is going to avoid, while detecting the advancing direction of said obstacle by said obstacle detecting unit, said path producing unit produces another different avoiding path, with setting a time, from when determining that the advancing direction of said obstacle changes to the avoiding direction of itself until when said path producing unit produces that different avoiding path, to a numerical value, being different from each robot, when said obstacle is a plural number of robots.

According to the present invention mentioned above, the

BRIEF DESCRIPTION OF THE DRAWINGS

Those and other objects, features and advantages of the present invention will become more readily apparent from the following detailed description when taken in conjunction with the accompanying drawings wherein:

FIG. 4 is a view for showing an example of information relating to a method for avoiding;

FIG. 8 is a view for showing an example where the autonomous mobile robot device mentioned above selects a method for avoiding;

DETAILED DESCRIPTION OF THE PREFERRED EMBODIMENTS

Hereinafter, embodiments according to the present invention will be fully explained by referring to the attached drawings.

Figure 1:
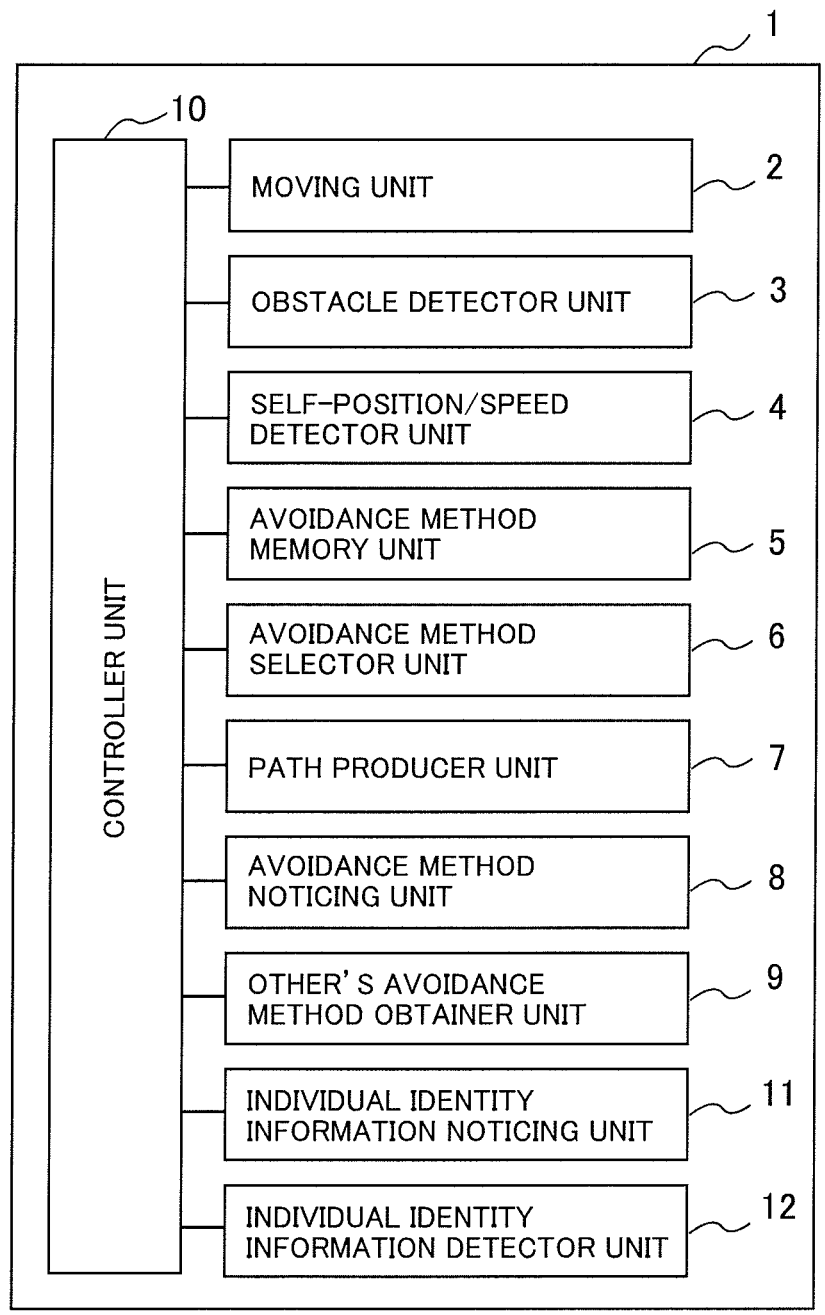
FIG. 1 is a view for showing an example of the structures of an autonomous mobile robot device, according to an embodiment of the present invention.

FIG. 1 is a view for showing an example of the structures of an autonomous mobile robot device, according to an embodiment of the present invention.

A reference numeral 1 in the figure depicts the autonomous mobile robot device. A reference numeral 2 depicts a moving means or unit, being made up with, such as, wheels and a motor, and a motor driver, etc., for example, and it moves the autonomous mobile robot device itself.

A reference numeral 3 depicts an obstacle detector means or unit, being made up with, such as, a laser radar and a computation device, for example, and it measures distance up to peripheral things, so that it obtains a relative position to the autonomous mobile robot device 1 from an averaged distances, while considering an area or region continuing about same distances as one (1) obstacle. Also, for example, it may be made up with a camera and a video processing apparatus, wherein the video picked up with the camera is processed within the video processing apparatus, so that an obstacle is divided or separated from a background picture, i.e., it measures the position of the obstacle with respect to the background, and thereby obtaining the relative position with respect to the autonomous mobile robot device 1. The measurement is conducted, periodically; so that a speed is obtained for each obstacle from changes of the relative positions while considering those having an analogy or likeliness to previous measurement data are same obstacles. For determining the analogy or likeliness may be applied the position, configuration and/or color, etc. In case where the processing capacity of the obstacle detector means or unit 3 is low, calculation of the speed of the obstacle may be omitted.

A reference numeral 4 depicts a self position/speed detector means or unit, and for example, it calculates out a self-position/speed through obtaining a traveling distance from the position of an origin or starting point, by obtaining an accumulated rotation number of a wheel, for example.

A reference numeral 5 depicts an avoidance method memory means or unit, and in more details thereof, it memorizes therein algorithm for producing a route or path for avoiding the obstacle, and it may be achieved by writing the algorithm into a hard disk, for example.

A reference numeral 6 depicts an avoidance method selector means or unit, and in more details thereof, it is a computation device for selecting an avoidance method among from the avoidance methods, which are memorized in the avoidance method memory means 5 as the avoiding information. More details of the selecting method will be mentioned later.

A reference numeral 7 depicts a path producer means or unit, and in more details thereof, it is a computation device for producing a moving path of the autonomous mobile robot device 1, in accordance with the algorithm, which the avoidance method selector means 6 selects upon basis of the obstacle information detected by the obstacle detector means 3.

Figure 2:
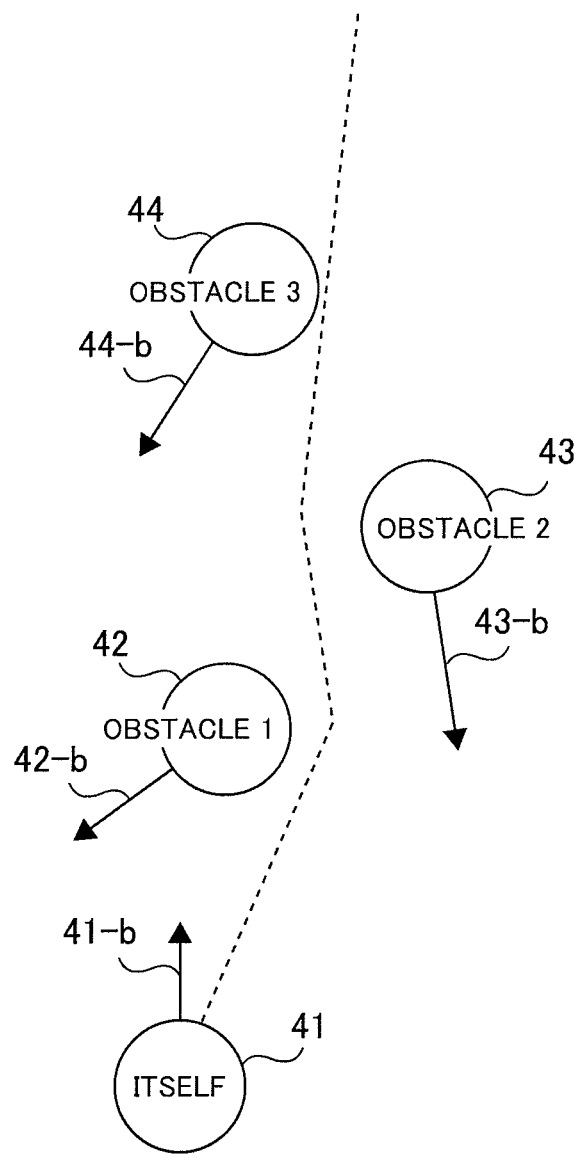
FIG. 2 is a view for showing an example of moving paths, which is produced by the autonomous mobile robot device mentioned above.

FIG. 2 is a view for showing an example of the moving route or path, which is produced by the autonomous mobile robot device 1 mentioned above. A reference numeral 41 depicts a self-robot (hereinafter, may be called "self"), and reference numerals 43, 43 and 44 depict obstacles. A reference numeral 41-*b* depicts a vector indicating a present speed of the self-robot 41. Reference numerals 42-*b*, 43-*b* and 44-*b* also indicate the present speeds of the obstacles. The path producer means 7 calculates out such a route or path that the self-robot 41 does not collide on each of the obstacles, with each other. Hereinafter, this path producing method will be called as a path producing method "a".

Figure 3:
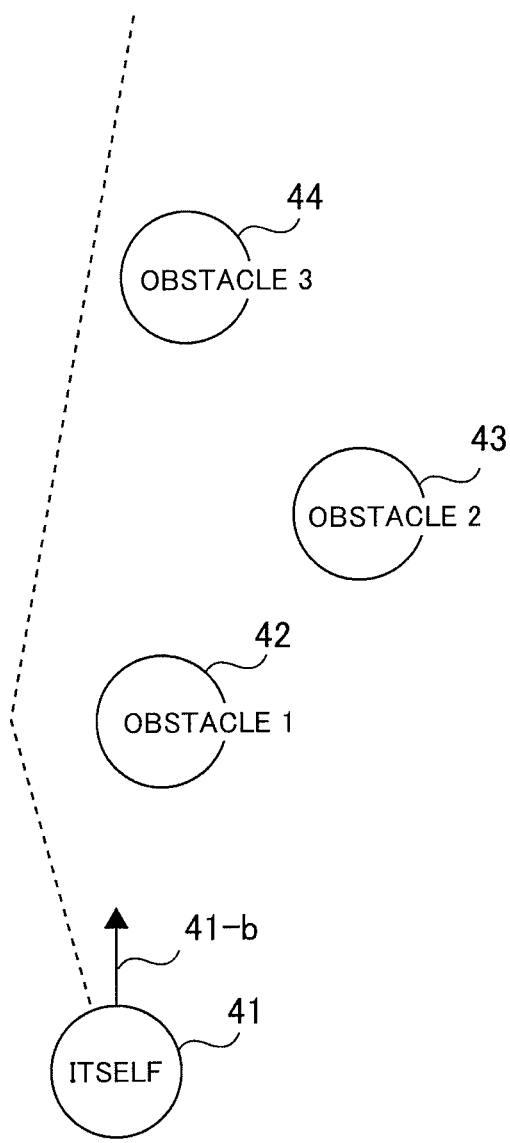
FIG. 3 is a view for showing other example of moving paths, which is produced by the autonomous mobile robot device mentioned above.

FIG. 3 is a view for showing an example of other produced moving path, which is produced by the autonomous mobile robot device 1 mentioned above. This is an example of the moving path that is produced by the path producer means 7, in particular, when the speed of the obstacle cannot be calculated because of a low processing capacity of the obstacle detector means 3. In this case, the self-robot 41 calculates out such a path that they do not collide with each other, corresponding to the present positions of the obstacles 42, 43 and 44. Hereinafter, this path producing method will be called as a path producing method "b".

A reference numeral 8 depicts an avoidance method noticing means or unit, and it notices the information relating to the avoidance method to other robot(s) (hereinafter, may be called "other"), through communication, such as, a wireless LAN or a near field communication (NFC), for example.

FIG. 4 is a view for showing an example of the information relating to the avoidance method. Information included this information relating to the avoidance method differs from, depending on the performances of the robot. Explanation about the more detailed contents of the information relating to the avoidance method will be mentioned later.

A reference numeral 9 depicts an other's avoidance method obtainer means or unit, and it obtains information relating to the avoidance method, which the other informs, through the communication.

A reference numeral 11 depicts an individual identity information noticing means or unit, and it notices the information, which can be informed by means other than the communication, such as, an individual identity information among the information relating to the avoidance method, to other robot (s) and/or human beings, through a visual display, such as, a painting or a liquid crystal display, etc., for example.

A reference numeral 12 depicts an individual identity information detector means or unit, and it obtains the information, which is informed with the individual identity information informing means 11 by other(s), through a camera and a video processing apparatus, for example. Through processing the video obtained by the camera, the individual identity information is detected, and further there is obtained a special position where the individual identity information is detected.

A reference numeral 10 depicts a controller means or unit, and it is a computation apparatus for controlling each of the means mentioned above.

Explanation will be made on the information relating to the avoidance method shown in FIG. 4 mentioned above.

(1) "Avoiding performances" are information for indicating capacities of the robot, in particular, an obstacle detecting capacity and a path producing capacity, and it differs from depending on the structures of the robot. For example, a robot of high performances is able to detect the position and the speed of the obstacle with high accuracy, and is able to produce the path with the path producing method "a". On the other hand, a robot of low performances is only able to detect the position with low accuracy, but unable to detect the speed of the obstacle, therefore it produces the path with the path producing method "b".

(2) An "avoiding direction" is information for indicating to avoid to the right-hand side or to the left-hand side when avoiding the obstacle. There are two (2) ways of presentation to the right or to the left. A first way of presentation is to change the direction of advancement of the robot itself at the present to the left or to change to the right, with respect to the direction of advancement of robot itself. A second way of presentation is to pass through on the right-hand side or the left-hand side of that obstacle, judging from the robot itself, when passing by each obstacle. The avoiding direction information includes the information of which one of the ways it is presented. It is possible to produce the avoiding path, being much smooth, not with the first one, but with the second way of presentation. However, with the second way of presentation, since a positional relationship must be estimated or forecasted when it passes by, with detecting the speed of the obstacle, and therefore the path cannot be presented by the second way of presentation for the robot of low performances.

(3) "Position information" is the present positional information of the robot of an origin of the information. This is used by a robot, which obtains the information relating to the avoidance method, for checking the avoidance method and the obstacle detected by the obstacle detector means 3, etc.

(4) "Individual identity information" is that for indicating a number unique to each robot, for identifying the robots one by one. The robot obtaining the information relating to the avoidance method compares that avoidance method obtained, the individual identity information obtained by the individual identity information detector means 12, which will be mentioned later, and the position wherein that individual identity information exists, and the position of the obstacle, which the obstacle detector means 3 detects, and uses them for checking the avoidance method obtained and the obstacle, which the obstacle detector means 3 detects.

Depending on the structures of the robot, since it is possible to check the avoidance method and the obstacle, which the obstacle detector means 3 detects, if there is either (3) or (4) mentioned above, then it is enough that the either (3) or (4) mentioned above exists.

Or, it may be also used to determine on which direction of avoidance the priority should be taken, in comparison of the avoidance directions of the robot itself and the other, which will be mentioned later. For example, the priority may be determined upon whether a numerical value is large or small, while converting the individual identity information as the numerical values, for example.

(5) "Notice time" is the time when the information relating to the method avoidance is informed. This is used when determining on which direction of avoidance the priority should be taken, in comparison of the avoidance directions of the robot itself and the other, which will be mentioned later. For example, the priority may be given to one, which is earlier in the notice time. As the method for determining the priority in the direction of avoidance may be either (4) or (5), and the notice time may not be included in the unnecessary one.

An "existence/position of company" is a flag indicating the robot itself has a company and the information indicating the position of that company. They are provided for the purpose that the robot itself does not pass between the other and the company.

Figure 5:
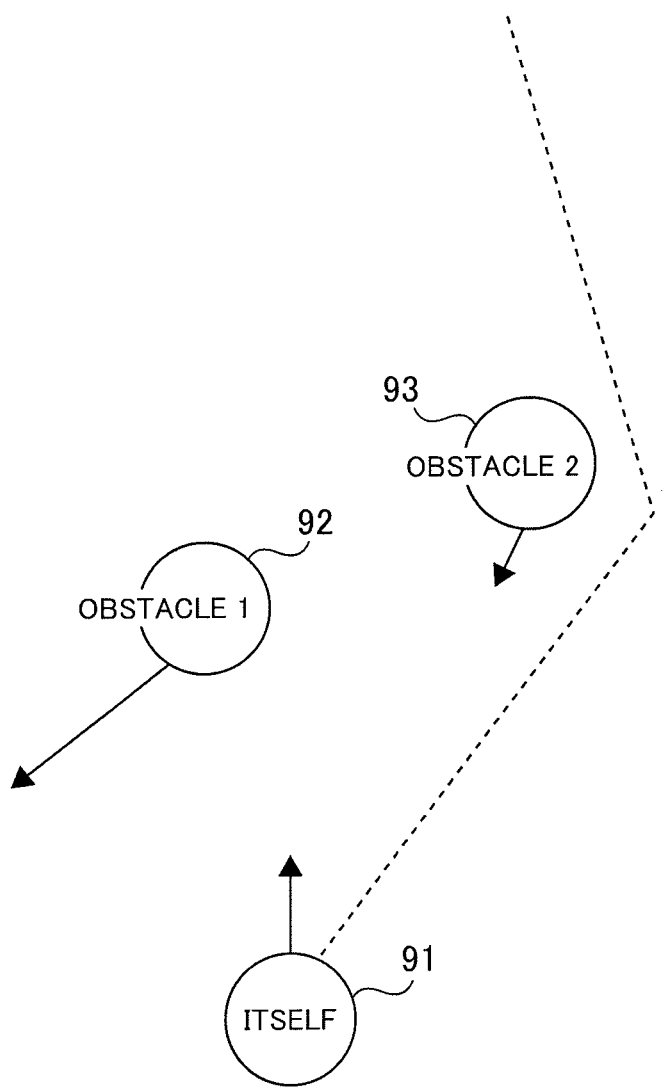
FIG. 5 is a view for showing further other example of moving paths, which is produced by the autonomous mobile robot device mentioned above.

FIG. 5 is a view for showing an example of the other produced moving path, which is produced by the autonomous mobile robot device mentioned above. A reference numeral 91 depicts the robot itself, reference numerals 92 and 93 the others, i.e., the obstacles for the robot itself 91, respectively. In case where the information of existence of the company and position of the company are included within the information relating to the method of avoidance of others, which is received by the robot itself 91 from the other 92, the position information of itself and the position of the company within the information relating to the method of avoidance of others are compared to the position of the obstacle detected, and thereby identifying the fellow robots accompanying the corresponding company as the obstacles. And, the path producer means 7 produces a path, but other than the path passing between the fellow companies.

(7) A "pass prohibition direction" is information for indicating the direction, into which the robot should not pass when the other passes by.

Figure 6:
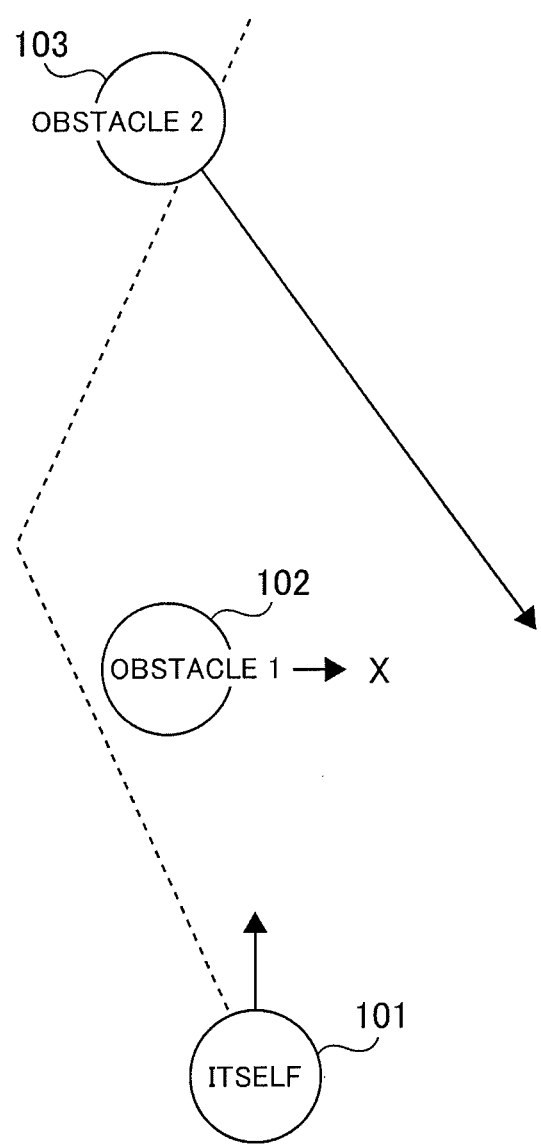
FIG. 6 is a view for showing further other example of moving paths, which is produced by the autonomous mobile robot device mentioned above.

FIG. 6 is a view for showing an example of the other produced moving path, which is produced by the autonomous mobile robot device mentioned above. A reference numeral 101 depicts the robot itself, a reference numeral 102 the other, i.e., the obstacle for the robot itself 101, and a reference numeral 103 further other obstacle, respectively. For example, the information "North" is entered into the pass prohibition direction, when the other 102, detecting the obstacle 103, determines it is dangerous for the other 102 to pass into "North" direction of the robot itself 101. In case where the information relating to the pass prohibition direction is included within the information of other's avoidance method from the other 102, which is received by the robot itself 101, the path producer means 7 produces a path, but other than the path passing into the direction designated.

(8) "Obstacle detection information" is position and speed information of the obstacle, which the robot itself detects. This is to be used when the other produces the path.

Figure 7:
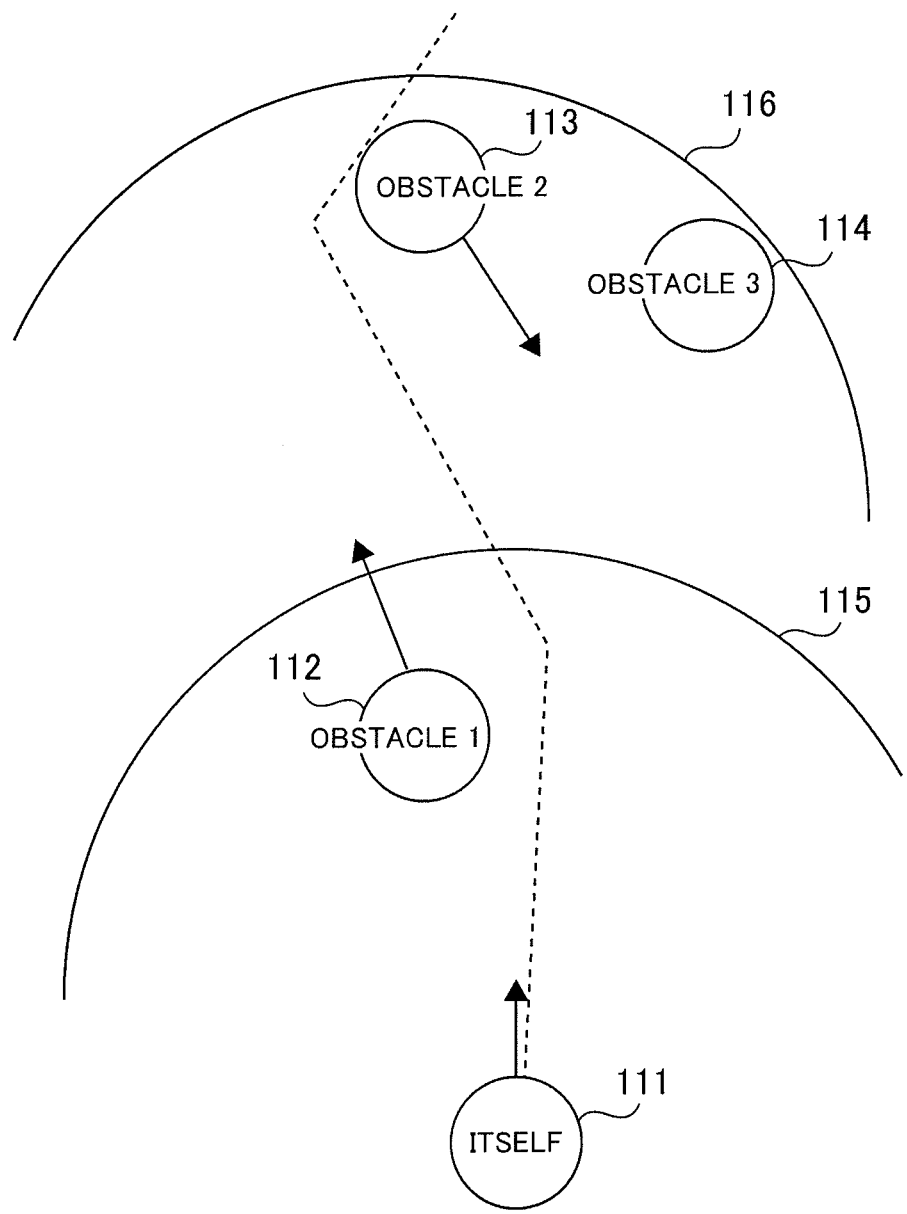
FIG. 7 is a view for showing further other example of moving paths, which is produced by the autonomous mobile robot device mentioned above.

FIG. 7 is a view for showing an example of the other produced moving path, which is produced by the autonomous mobile robot device mentioned above. A reference numeral 111 depicts the robot itself, a reference numeral 112 the other, i.e., the obstacle, and reference numerals 113 and 114 the other obstacles, respectively. For example, when the robot 112 detects the obstacles 113 and 114, then the robot 112 enters the position/speed information of the obstacles 113 and 114 into the obstacle detection information. In case where the obstacle detection information mentioned above is included within the information of other's avoidance method from the robot 112, which is received by the robot itself 111, the path producer means 7 produces a path for avoiding all of the obstacles, including the obstacle detection information within the information of other's avoidance method from the robot 112, which is received by the robot itself 111.

FIG. 8 is a view for showing an example for the autonomous mobile robot device mentioned above to select the avoidance method. The avoidance method selector means 6 of the autonomous robot device 1 determines on whether the other's avoidance method obtain means 9 obtains the information or not, relating to the method for avoiding the other robot, and if it obtains, it changes the avoidance method to be selected, depending upon contents of the information relating to the method for avoiding the other robot.

In case where no information is obtained relating to the avoidance method, which the other robot informs, the avoidance method is selected for a case of not obtaining the information relating to the avoidance method, on the other hand where it is obtained, and then the avoidance method is selected. Hereinafter, the former is called by an avoidance method "A" while the latter by an avoidance method "B".

In case of the avoidance method "A", there is produced a path for reaching to a destination or goal without colliding with the obstacle(s). If there can be considered plural numbers of paths, then only one of them is selected. A standard for selection may be, such as, the shortest distance, or a path of passing an opposite side to the advancing direction of the obstacle, etc., for example.

In case of the avoidance method "B", comparison is made between the avoiding directions of the robot itself and the other, upon basis of the information relating to the avoidance method, which is informed by the other robot. If there is possibility that the both collide each other, then either one of them changes the avoiding direction thereof. As an example, for either one to change the avoiding direction, for example, comparison is made upon avoiding performances between the robot itself and the other robot, then the robot, which is higher in the avoiding performances, changes the direction. If both have the same performances, for example, comparison is made on a peculiar or unique number, i.e., the individual identity number, thereby giving the priority to a younger one. Also, in other example, comparison is made on the notice times, and then the priority is given to an earlier one. And then is produced a path up to the goal satisfying the avoiding directions, which are obtained by those.

Figure 9:
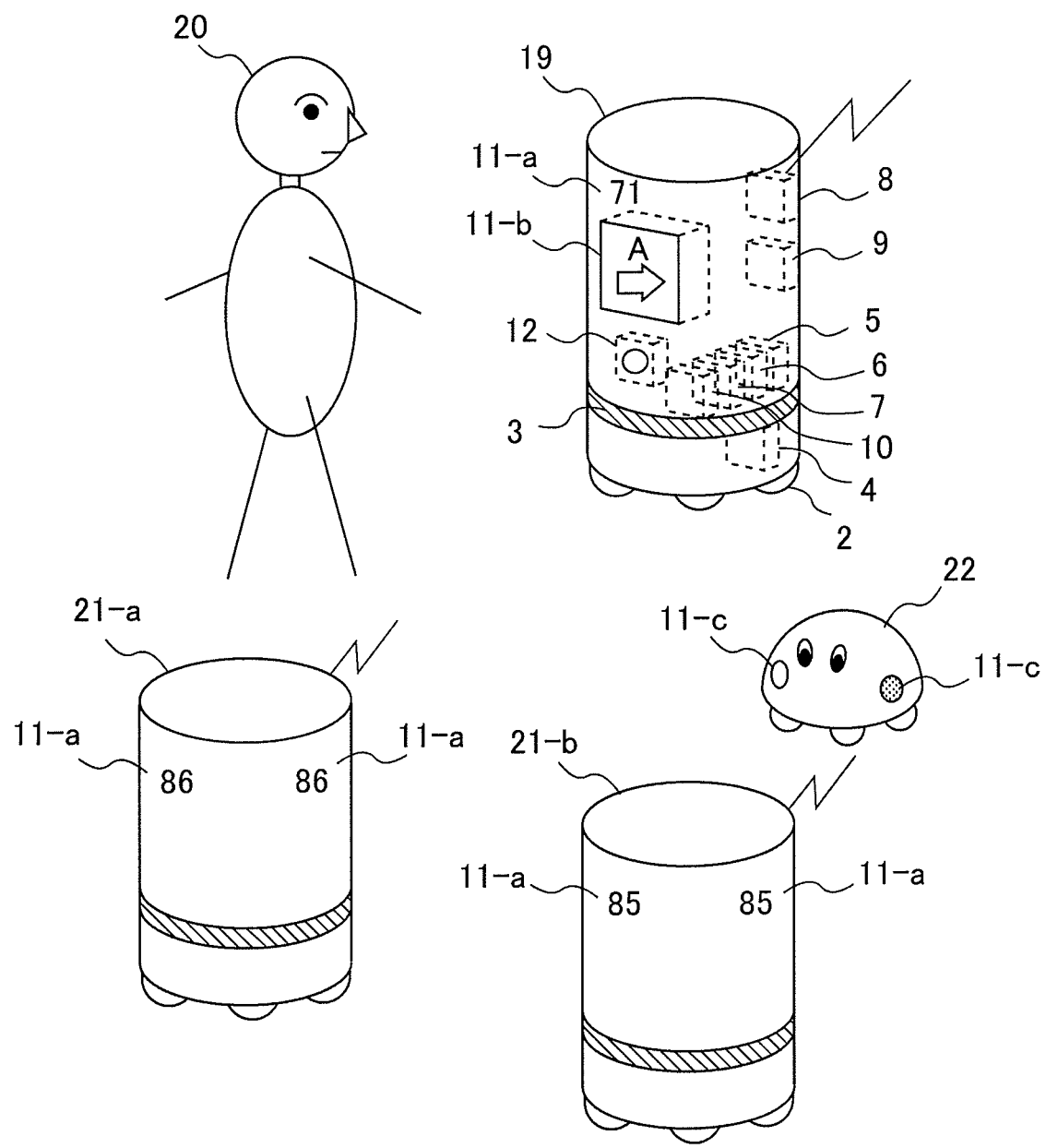
FIG. 9 is a view for showing an example where the autonomous mobile robot device mentioned above operates.

FIG. 9 is a view for showing an example of the autonomous mobile robot mentioned above. The reference numerals in this figure are common with those shown in FIG. 1. Reference numerals 19, 21-*a*, 21-*b* and 22 depict the autonomous mobile robots 1 as the individuals. Hereinafter, each of the individuals is called "a robot". A reference numeral 20 depicts a human being, respectively. Those reference numerals 19, 21-*a* and 21-*b* are high-performance robots, and the reference numeral 22 is a low-performance robot.

A reference numeral 11-*a* depicts the individual identity information, which is painted on a surface of housing of the robot. For example, on the robot 19 is painted a number "71". This is a number differing from, for each robot. A reference numeral 11-*b* depicts avoiding performance information and avoiding direction information, which are presented on a liquid crystal display of the robot 19. For example, at the present are displayed "A" and "→" on the robot 19, wherein "A" indicates the avoiding performance is high performance, and "→" indicates that robot is now under changing of the present advancing direction, to the left-hand side seeing it from the robot itself.

A reference numeral 11-*c* depicts avoiding direction information, which is indicated by a lamp. Thus, it indicates that the robot is now under changing of the advancing direction to the direction where the lamp is lightening.

Figure 10:
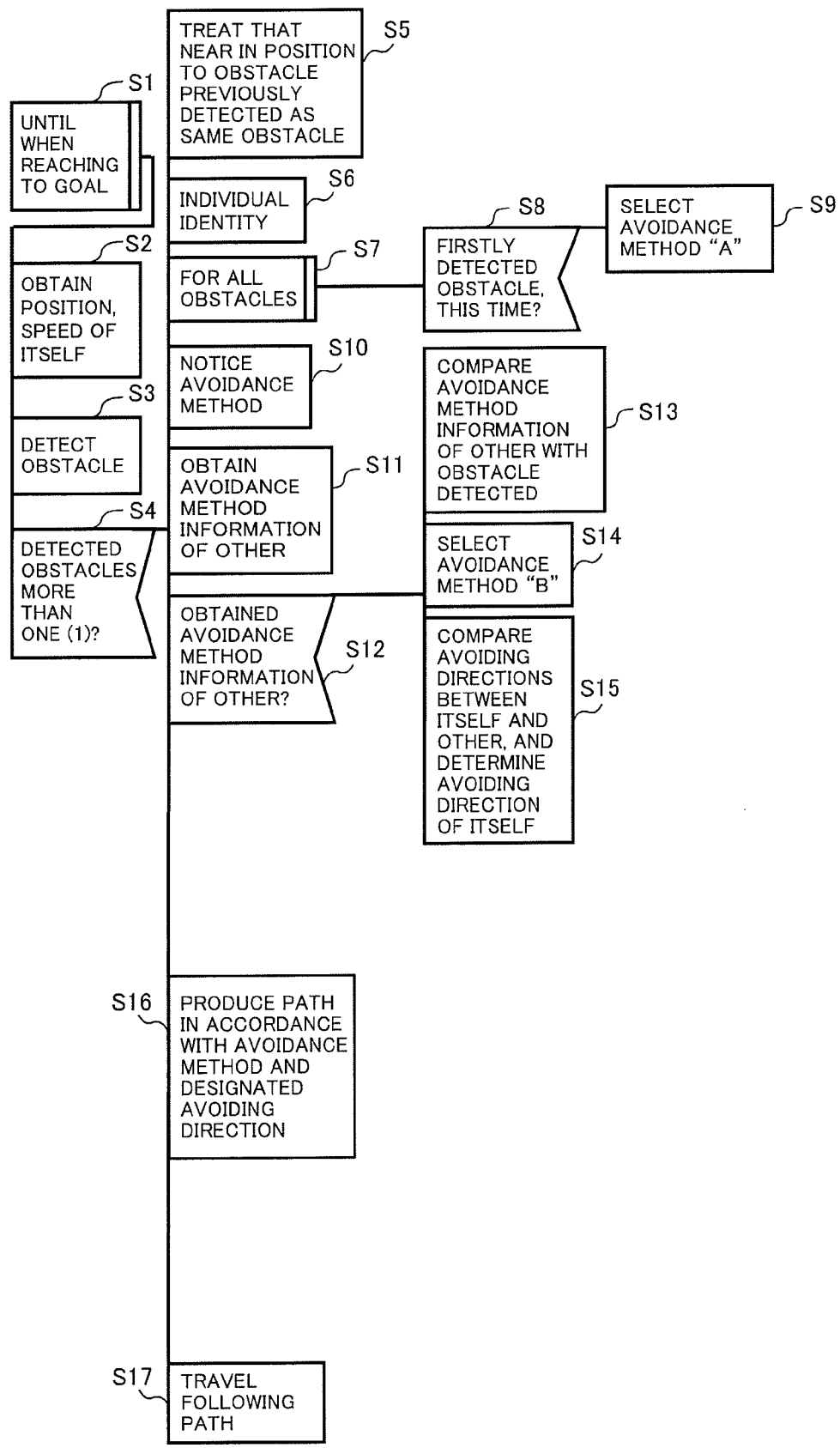
FIG. 10 is a view for explaining a flow of movement controls executed within the autonomous mobile robot device mentioned above.

FIG. 10 is a view for explaining flows of moving control within the autonomous mobile robot device mentioned above.

The autonomous mobile robot device 1, during the time-period until when it reaches to the goal (S1), repeats the following processes. First of all, the self-position/speed detector means 4 detects the position and the speed of itself (S2). Next, the obstacle detector means 3 detects the obstacle (S3). When detecting the obstacle more than one (1) (S4), then the following processes are executed.

First of all, the obstacle detector means 3 compares the position of the obstacle, which was detected at previous time, and the position of the obstacle, which is detected at present, and determines those being close to each other to be a same obstacle (S5). The individual identity information detector means 12 detects the individual identity information, and checks the obstacle detected and the individual identity information (S6). Then, upon the obstacle detected, it is investigated on whether the obstacle is detected this time, for the first time, or not (S7). Thus, if that close in the position cannot be found in the obstacles, which were detected at the previous time, in the process (S6), then it is determined to be the obstacle, which is detected for the first time (S8). Next, the avoidance method informing means 8 informs the avoidance method of itself to the other(s) (S10). The other's avoidance method obtain means 9 obtains the avoidance method of other(s) (S11). When obtaining the avoidance method of other (S12), comparison is made between the avoidance method of the other and the obstacle detected (S13), and the avoidance method "B" is selected (S14). And, the avoiding direction is determined with comparing the avoidance methods of itself and the other (S15).

Thereafter, the path producer means 7 produces a path in accordance with the avoidance method, which is obtained from each of the obstacles. In this instance, in case of the avoidance method "B", also the information is used, which is obtained relating to the other's avoidance method, i.e., the information of presence/absence of the company and the position thereof, the information of pass-prohibition direction, and the information of obstacle detection (S16). Thereafter, the moving means 2 runs following the path produced (S17).

From the above, in case where the obstacle is a robot, they are able to produce the paths for avoiding each other, by knowing the avoidance methods thereof with each other, and therefore they are able to move smoothly.

Also, since the robot can obtain the information relating danger(s) from other robot(s), therefore it is able to produce a path avoiding the danger(s), i.e., the obstacle(s) other than those that can be detected by the obstacle detector means 3 of itself.

Figure 11:
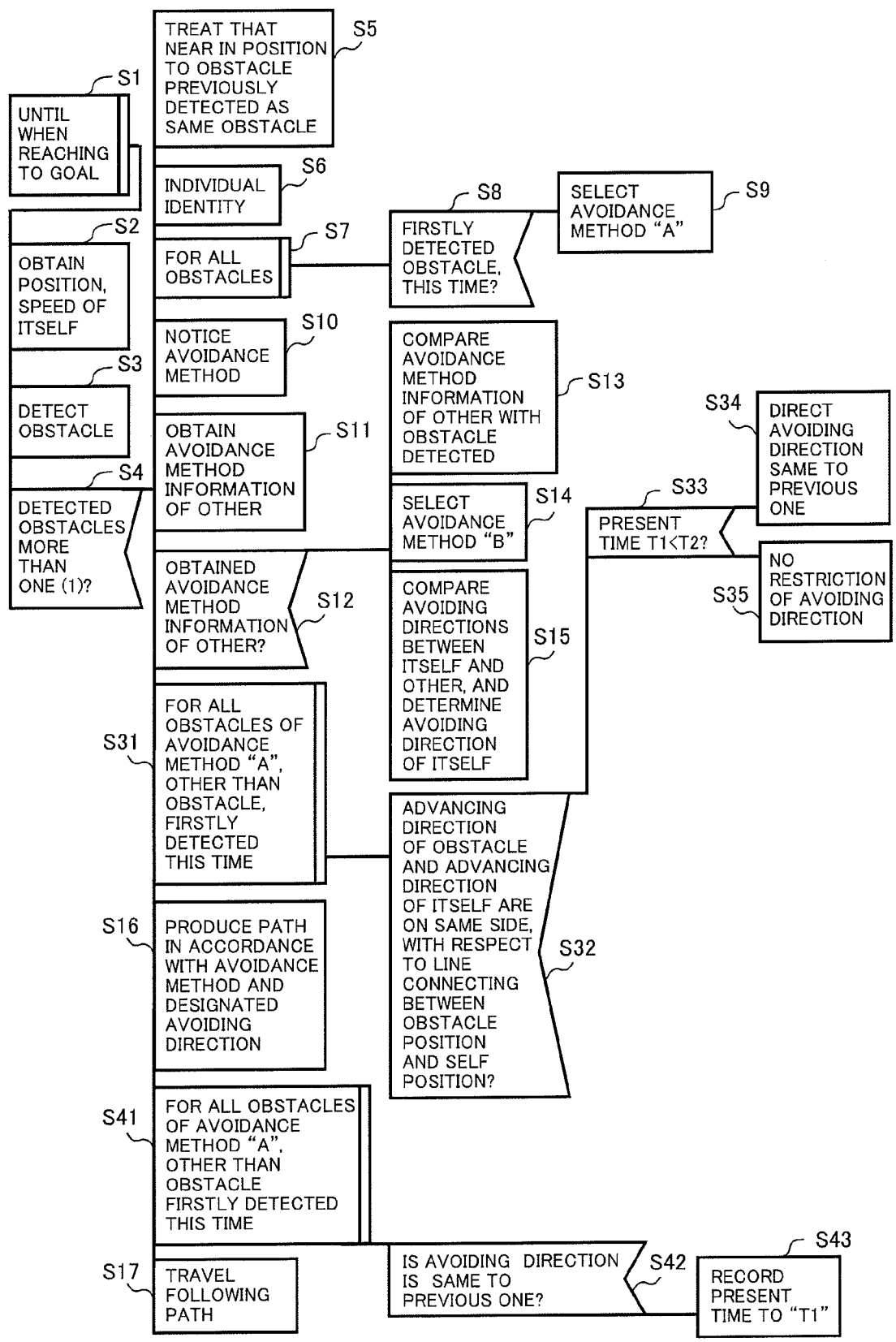
FIG. 11 is a view for explaining other flow of movement controls executed within the autonomous mobile robot device mentioned above.

FIG. 11 is a view for explaining other flows of movement control within the autonomous mobile robot device mentioned above. Explanation will be given on the flows of the movement control of the autonomous mobile robot device 1, adding therein processes for treating with the case where the obstacle and the robot itself are trying to avoid, but in the same direction, in particular, in the case of the avoidance method "A".

The processes from S1 to S17 are same to the movement control shown in FIG. 10. Before executing the step S16, for the obstacle (s) other than it/those detected this time, for the first time, and further for all the obstacles of the avoidance method "A" (S31), check is made on whether the advancing direction of the obstacle and the present advancing direction of itself are on the same side or not, with respect to a straight line connecting between the position of the detected obstacle and the position of the robot itself (S32). In case where they are on the same side, the difference between the preset time and the time "T1", when the avoiding direction is changed lastly, is equal or less than a predetermined time "T2" or not (S33). In case where it is equal or less than "T2", then the path to be produced in S16 is directed to the avoiding direction same to that, which was produced previously (S34). If it exceeds "T2", the path to be produced in S16 is provided with no restriction in the avoiding direction (S35).

After S16, for the obstacle that the robot will pass by at earliest, and that other than the obstacle, which is detected this time, for the first time, and further for all the obstacles of the avoidance method "A" (S41), check is made on whether the avoiding direction is same or not, to that which is produced in the previous step S16 (S42), and in case where it is not same, then the present time is recorded as "T1" (S43).

For the purpose of preventing the condition from being continued, that the obstacle and the robot itself change the avoiding directions thereof, at the same time, in particular, when trying to avoid from each other in the same direction, it is preferable that the time when the obstacle changes the avoiding direction differs from the time when the robot itself changes that. Thus, it is preferable that the time is different for the obstacle and the robot, i.e., the time-period, after determining the avoiding direction to execute an avoiding movement, and acknowledging the avoiding direction of the other, and thereby determining that they are trying to escape or avoid from each other, but into the same direction, up to the time when the robot actually changes the avoiding direction (i.e., an exchange time "T2"). In case where the obstacle is a human being, the exchange time has an individual difference, and if it is the same person, the exchange time is almost constant. Accordingly, when the robot determines "T2" with using a random number, if the robot itself and the obstacle change the direction at the same time, for the first time, but for the second time, the possibility is high that the robot itself and the obstacle change the direction at the different times, i.e., the condition of taking the avoiding directions into the same direction can be dissolved early. The timing for determining "T2" with using the random number may be in S33 or S43.

Also, even under the circumferences where plural numbers of robots go back and forth, and where the robots cannot communicate the avoiding directions with each other, there is also a possibility of brining about the condition that the avoiding directions of the robots themselves are coincide with. In case of the robots themselves, the coincidence in the avoiding direction can be dissolved, early, with also a method of determining the value of "T2" to be different for each of the robots.

Figure 12:
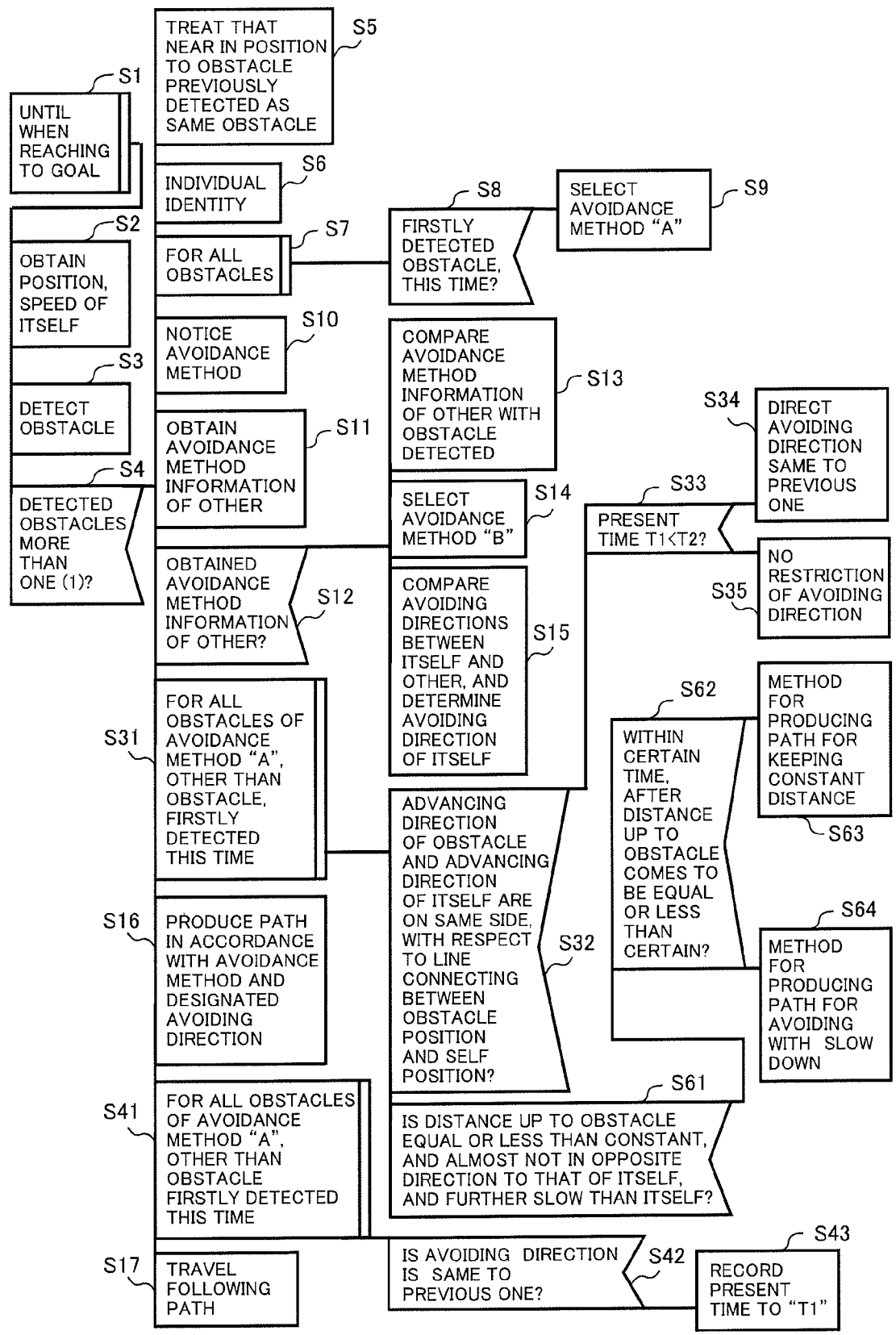
FIG. 12 is a view for explaining further other flow of movement controls executed within the autonomous mobile robot device mentioned above.

FIG. 12 is a view for explaining other flows of the movement control within the autonomous mobile robot device mentioned above. Explanation will be made on the flows of the movement control of the autonomous mobile robot device 1, adding therein the processes for treating the case of avoiding the danger(s), which cannot be detected by itself, in particular, in the case of the avoidance method "A". Thus, the steps S61 to S65 are added in the processes shown in FIG. 11.

First of all, check is made on whether there is an obstacle or not, being at the distance up to the obstacle being equal or less than a predetermined distance "L", not directing into a direction almost opposite to that of itself, and further at a speed being equal or less than a predetermined speed "V" (S61). Then, check is made on whether the time, elapsing from the time when the distance up to the obstacle comes to be equal or less than "L", is equal or less than "T5" or not (S62), and if it is equal or less than "T5", then a method is set up for producing the path to keep a constant distance (S64), i.e., a method for producing path is determined so as to produce the path in S16.

Figure 13:
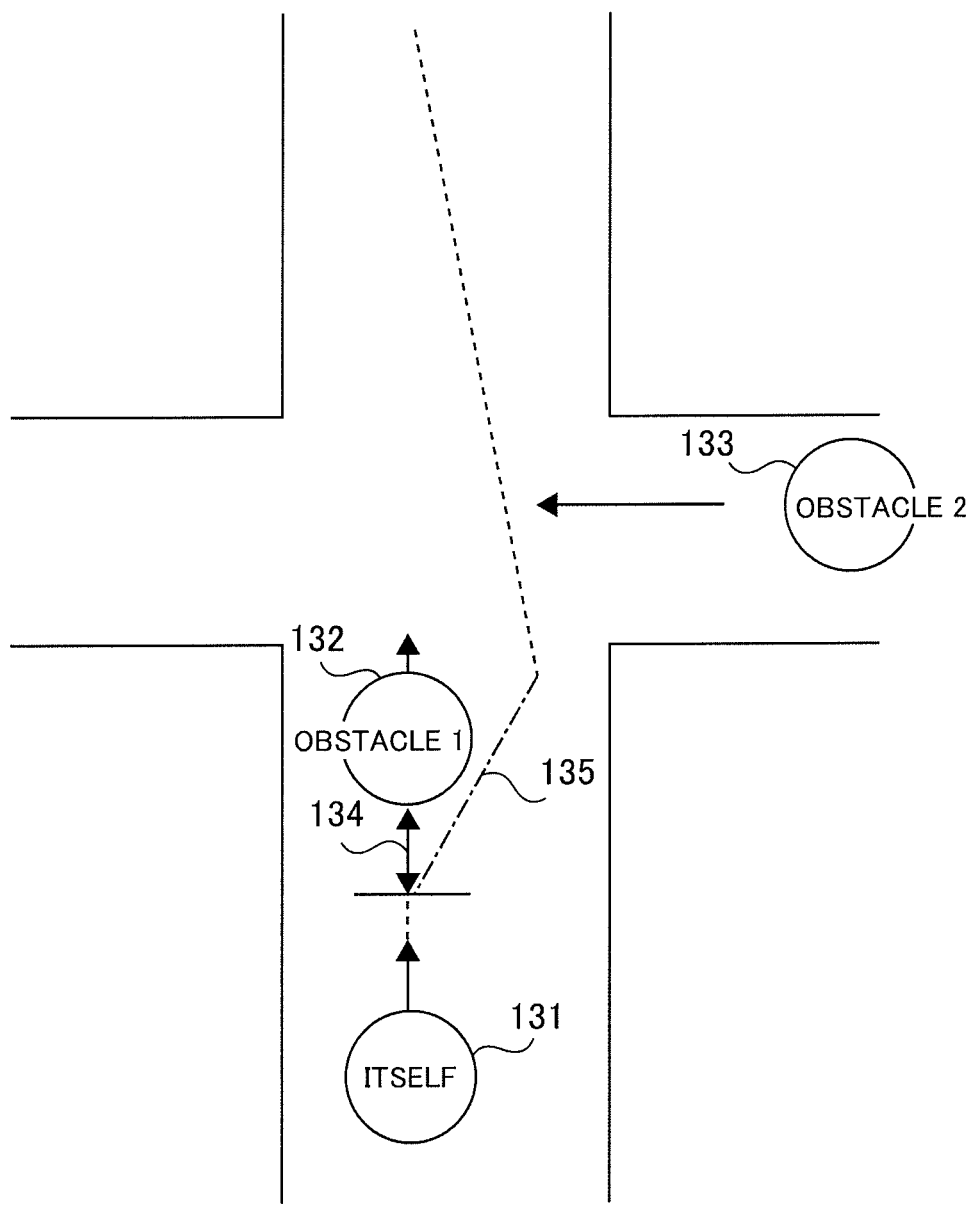
FIG. 13 is a view for showing an example of other moving paths, which is produced within the autonomous mobile robot device mentioned above.

FIG. 13 is a view for showing an example of other moving path, which is produced within the autonomous mobile robot device mentioned above. A reference numeral 131 depicts the robot itself, a reference numeral 132 the obstacle, which the robot itself 131 can detected, and a reference numeral 133 the obstacle, which is in the position where the robot itself cannot detect. In case where the obstacle goes slowly (or, slowdown), for the purpose of waiting for passage of the obstacle 133, the robot itself 131 keeps the constant distance "L" therefrom, as is indicated by a reference numeral 134. And, after elapsing the predetermined time "T5", it travels along the path for avoiding the obstacle, as is shown by a reference numeral 135. The "T5" is almost equal to the time to be taken, for crossing over the width of a passage at a general traveling speed.

With this, also for the obstacle 312, for which the avoidance method cannot be obtained, in case where the obstacle 312 goes slowly (or, slowdown) or stop, for avoiding the danger of colliding with the obstacle 133 or the like, the robot itself 131 can stay behind the obstacle 132. Thereafter, since it goes slowly when the robot itself travels along the path 135 for avoiding the obstacle 132, therefore it is possible to reduce the danger with respect to the unknown obstacle 133.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An autonomous mobile robot device, comprising:
    an obstacle detecting unit, which is configured to detect an obstacle;
    a unit for obtaining an avoidance method used by an obstacle, which is configured to obtain, from said obstacle, information relating to an avoidance method used by said obstacle;
    an avoidance method memorizing unit, which is configured to memorize one or more of: a predetermined avoidance method and an avoidance method used by said obstacle; and
    an avoidance method selecting unit, which is configured to select an avoidance method from said avoidance method memorizing unit, wherein said avoidance method selecting unit uses, as a reference, information relating to an avoidance method used by said obstacle, obtained by said unit for obtaining an avoidance method used by an obstacle, when selecting said avoidance method;
    an avoidance method monitoring unit, which is configured to monitor information relating to said selected avoidance method used by said autonomous mobile robot device to avoid said obstacle;
    a path producing unit, which is configured to produce a path for reaching a destination while avoiding said obstacle, based upon said selected avoidance method;
    a moving unit, which is configured to move said autonomous mobile robot device along said produced path;
    wherein information relating to an avoidance method is presented via a display and includes: avoiding direction information indicative of a direction of avoiding, and avoiding performance information indicative of avoiding performances.

2. The autonomous mobile robot device, as described in the claim 1, said autonomous mobile robot device further comprising:
    an individual identity information detecting unit, which is configured to detect an individual identity information of said obstacle, wherein information relating to an avoidance method includes individual identity information;
    wherein said obstacle, and said avoidance method used by said obstacle, are related to one another, by use of said individual identity information.

3. The autonomous mobile robot device, as described in the claim 1,
    wherein information relating to an avoidance method includes: position information indicative of a position of at least one of said autonomous mobile robot device and of said obstacle; and
    wherein said obstacle, and said avoidance method used by an obstacle, are related to one another, by use of said position information.

4. The autonomous mobile robot device, as described in the claim 1,
    wherein information relating to an avoidance method includes: presence/absence information of a companion, indicative of whether said obstacle accompanies said companion or not, position information of said companion, and individual identity information of said companion; and
    wherein said path producing unit produces a path that does not pass between said obstacle and said companion, when information relating to the avoidance method used by said obstacle indicates that said obstacle has a companion.

5. The autonomous mobile robot device, as described in the claim 1,
    wherein information relating to an avoidance method includes: information relating to a pass prohibition direction therein; and
    wherein said path producing unit produces a path that does not go in the pass prohibition direction, when the information relating to the avoidance method used by said obstacle includes information relating to said pass prohibition direction.

6. The autonomous mobile robot device, as described in the claim 1,
    wherein information relating to an avoidance method includes: information relating to detection of the obstacle; and wherein when information relating to said avoidance method used by said obstacle includes information relating to detection of said obstacle, said path producing unit produces a path, avoiding the obstacle indicated by the information relating to detection of said obstacle, which said unit for obtaining an avoidance method used by an obstacle obtains.

7. The autonomous mobile robot device, as described in the claim 1,
wherein said avoidance method selecting unit selects an avoidance method, and does not obtain the avoidance method of an obstacle from said avoidance method memorizing unit, until when said unit for obtaining an avoidance method used by an obstacle obtains the information relating to the avoidance method used by the obstacle, which said obstacle detecting unit detects.

8. An avoidance method for an autonomous mobile robot device, comprising:
detecting an obstacle by using an obstacle detecting unit;
producing, by using a path producing unit, a path for reaching a destination while avoiding said obstacle, upon basis of a predetermined obstacle avoidance method; and
moving said autonomous mobile robot device by using a moving unit;
wherein said obstacle avoidance method comprises the following steps of:
monitoring, by using an obstacle avoidance method monitoring unit, information relating to an obstacle avoidance method used by said autonomous mobile robot device to avoid said obstacle;
obtaining from said obstacle, by using a unit for obtaining an obstacle avoidance method used by said obstacle, information relating to an obstacle avoidance method used by said obstacle;
memorizing, in an obstacle avoidance method memorizing unit, one or more of: said predetermined obstacle avoidance method used by said autonomous mobile robot device, and said obstacle avoidance method used by said obstacle; and
selecting a memorized obstacle avoidance method from said obstacle avoidance method memorizing unit, based upon information relating to the obstacle avoidance method used by said obstacle;
wherein information relating to an obstacle avoidance method is presented via a display and includes: avoiding direction information indicative of a direction of avoiding, and avoiding performance information indicative of avoiding performances.

9. The avoidance method for an autonomous mobile robot device, as described in the claim 8,
wherein when an advancing direction of said obstacle changes into a direction into which the autonomous mobile robot device is avoiding, while detecting the advancing direction of said obstacle by said obstacle detecting unit, said path producing unit produces a different avoiding path, with setting a time to a random number, said time representing from when to determine that the advancing direction of said obstacle changes to the avoiding direction of said autonomous mobile robot device until when said path producing unit produces that different avoiding path.

10. The avoidance method for an autonomous mobile robot device, as described in the claim 8,
wherein when an advancing direction of said obstacle changes into a direction into which the autonomous mobile robot device is avoiding, while detecting the advancing direction of said obstacle by said obstacle detecting unit, said path producing unit produces a different avoiding path, with setting a time to a numerical value, said time representing from when to determine that the advancing direction of said obstacle changes to the avoiding direction of said autonomous mobile robot device until when said path producing unit produces that different avoiding path, said different avoiding path being different from each robot when said obstacle includes a plurality of robots.

11. An autonomous mobile robot device, comprising:
an obstacle detecting unit, which is configured to detect an obstacle;
a path producing unit, which is configured to produce a path for reaching a destination while avoiding said obstacle, upon basis of a predetermined avoidance method; and
a moving unit, which is configured to move while mounting at least said obstacle detecting unit and said path producing unit thereon;
an avoidance method monitoring unit, which is configured to monitor information relating to an avoidance method used by said autonomous mobile robot device;
a unit for obtaining an avoidance method used by an obstacle, which is configured to obtain, from said obstacle, information relating to the avoidance method used by said obstacle;
an avoidance method memorizing unit, which is configured to memorize one or more of said avoidance methods; and
an avoidance method selecting unit, which is configured to select from said avoidance methods memorized in said avoidance method memorizing unit;
wherein said avoidance method selecting unit uses the information relating to the avoidance method used by said obstacle, as a reference, when selecting said avoidance method; and
wherein said information relating to the avoidance method is presented via a display and includes avoiding direction information indicating a direction of avoiding and avoiding performance information indicative of avoiding performances.

12. The autonomous mobile robot device, as described in the claim 11, wherein said information relating to the avoidance method includes individual identity information indicating an identity of an individual, and said autonomous mobile robot device further comprises:
an individual identity information detecting unit, which is configured to detect said individual identity information of said obstacle, wherein
said obstacle, and said avoidance method, which said unit for obtaining an avoidance method used by an obstacle obtains, are related with each other, with using said individual identity information.

13. The autonomous mobile robot device, as described in the claim 11, wherein
said information relating to the avoidance method includes position information indicating a position of said autonomous mobile robot device or said obstacle, and
said obstacle, and said avoidance method, which said unit for obtaining an avoidance method used by an obstacle obtains, are related with each other, with using said position information.

14. The autonomous mobile robot device, as described in the claim 11, wherein
said information relating to the avoidance method includes presence/absence information of a companion, indicating whether said obstacle accompanies said companion or not, position information of said companion, and individual identity information of said companion, and said path producing unit produces a path, not passing through between said obstacle and said companion, when the information relating to the avoidance method used by an obstacle, which said unit for obtaining an avoidance method used by an obstacle obtains, indicates that it has said companion.

15. The autonomous mobile robot device, as described in the claim 11, wherein said information relating to the avoidance method includes information relating to a pass prohibition direction therein, and said path producing unit produces a path, not passing in the direction designated, when the information relating to the avoidance method, which said unit for obtaining an avoidance method used by an obstacle obtains, includes the information relating to said pass prohibition direction.

16. The autonomous mobile robot device, as described in the claim 11, wherein said information relating to the avoidance method includes information relating to detection of the obstacle therein, and said path producing unit produces a path, avoiding the obstacle indicated by the information relating to detection of said obstacle, which said unit for obtaining an avoidance method used by an obstacle obtains, when the information relating to detection of said obstacle is included within the information relating to said avoidance method, which said unit for obtaining an avoidance method used by an obstacle obtains.

17. The autonomous mobile robot device, as described in the claim 11, wherein said avoidance method selecting unit selects an avoidance method for case of not obtaining the avoidance method used by an obstacle from said avoidance method memorizing unit, until when said unit for obtaining an avoidance method used by an obstacle obtains the information relating to the avoidance method from the obstacle, which said obstacle detecting unit detects.

18. The autonomous mobile robot device, as described in the claim 11, wherein said obstacle includes at least one robot.

* * * * *